US006197405B1

(12) United States Patent
Johnsen et al.

(10) Patent No.: US 6,197,405 B1
(45) Date of Patent: Mar. 6, 2001

(54) SURFACE DECORATION HAVING A 3-DIMENSIONAL EFFECT, AND METHOD OF PRODUCING A SURFACE DECORATION HAVING A 3-DIMENSIONAL EFFECT, AS WELL AS UTILIZATION OF A DECORATION HAVING A 3-DIMENSIONAL EFFECT

(75) Inventors: Torill Johnsen; Harald Johnsen, both of Lier (NO)

(73) Assignee: Graphic Origins Limited, Douglas (GB)

( * ) Notice: Subject to any disclaimer, the term of this patent is extended or adjusted under 35 U.S.C. 154(b) by 0 days.

(21) Appl. No.: 09/247,829

(22) Filed: Feb. 11, 1999

Related U.S. Application Data

(63) Continuation of application No. 08/829,116, filed on Apr. 10, 1997, now abandoned.

(30) Foreign Application Priority Data

| | | |
|---|---|---|
| Jun. 14, 1996 | (NO) | 962521 |
| Nov. 4, 1996 | (NO) | 964657 |

(51) Int. Cl.[7] ...... B32B 27/14

(52) U.S. Cl. ...... 428/195; 428/46; 428/908.9

(58) Field of Search ...... 428/31, 40, 46, 428/208, 908.8, 145

(56) References Cited

U.S. PATENT DOCUMENTS

| | | | | |
|---|---|---|---|---|
| 703,416 | | 7/1902 | Hirsch . | |
| 1,179,081 | | 4/1916 | Denne . | |
| 1,592,162 | | 7/1926 | Smith . | |
| 1,850,760 | | 3/1932 | Mantell . | |
| 2,133,914 | | 10/1938 | Burke | 41/26 |
| 2,622,991 | | 12/1952 | Sturm | 117/338 |
| 2,758,035 | | 8/1956 | Matthes | 117/3.6 |
| 3,558,395 | | 1/1971 | Plegat | 156/246 |
| 4,086,379 | | 4/1978 | Brown | 428/40 |
| 4,264,657 | | 4/1981 | Tollette | 428/35 |
| 4,505,968 | | 3/1985 | Ishii et al. . | |
| 4,696,844 | | 9/1987 | Spector | 428/46 |
| 4,720,409 | | 1/1988 | Spector | 428/46 |
| 4,721,635 | | 1/1988 | Helinski | 428/15 |
| 4,824,707 | | 4/1989 | Spector | 428/46 |
| 4,931,324 | * | 6/1990 | Ellison et al. | 428/31 |
| 5,032,711 | | 7/1991 | Yamada . | |
| 5,181,745 | | 1/1993 | Jacobsen et al. . | |
| 5,320,345 | | 6/1994 | Lai et al. . | |
| 5,342,666 | * | 8/1994 | Ellison et al. | 428/46 |
| 5,451,560 | | 9/1995 | Akada et al. | 503/227 |
| 5,452,508 | * | 9/1995 | Wu | 29/428 |
| 5,458,931 | | 10/1995 | Mankes | 428/14 |
| 5,562,451 | * | 10/1996 | Wilcox et al. | 434/84 |
| 5,662,977 | * | 9/1997 | Spain et al. | 428/42.1 |
| 5,871,834 | * | 2/1999 | Wang | 428/141 |
| 5,937,554 | * | 8/1999 | Haugk et al. | 40/310 |
| 5,960,527 | * | 10/1999 | Ellison et al. | 24/438 |

FOREIGN PATENT DOCUMENTS

| | | |
|---|---|---|
| 37 15 127 A1 | 9/1988 | (EP) . |
| 447040 | 9/1991 | (EP) . |
| 0 506 253 A1 | 9/1992 | (EP) . |
| 656265 | 6/1995 | (EP) . |
| 687579 | 12/1995 | (EP) . |
| 1299948 | 12/1972 | (GB) . |
| 1-314198 | 12/1989 | (JP) . |

* cited by examiner

*Primary Examiner*—Merrick Dixon
(74) *Attorney, Agent, or Firm*—Finnegan, Henderson, Farabow, Garrett & Dunner, L.L.P.

(57) ABSTRACT

A surface decoration having a 3-dimensional effect, for placement on a surface, comprising a transparent base sheet of film, a printed design on at least a portion of said base sheet, at least object illustration formed by said printed design and a shaded depiction of said object illustration formed by said printed design, said printed design being transparent in said shaded depiction.

11 Claims, 2 Drawing Sheets

SURFACE DECORATION HAVING A 3-DIMENSIONAL EFFECT, AND METHOD OF PRODUCING A SURFACE DECORATION HAVING A 3-DIMENSIONAL EFFECT, AS WELL AS UTILIZATION OF A DECORATION HAVING A 3-DIMENSIONAL EFFECT

This is a continuation of application Ser. No. 08/829,116, filed Apr. 10, 1997 now abandoned, which is incorporated herein by reference.

The present invention relates to a surface decoration having a 3-dimensional effect, for placement on a surface, comprising a transparent base sheet of film, a printed design on at least a portion of the base sheet and at least one object illustration formed by the printed design. The invention further relates to a method of producing a surface decoration having a 3-dimensional effect, comprising an object illustration formed by a monochrome or multicolored transparent printed design, where a body color print (opaque pigment) or a non-transparent film sheet is applied to a transparent base sheet of film over a portion of the base sheet surface, wherein the printed design is applied over at least a portion of the base sheet of film. The invention also relates to a utilization of a surface decoration.

It is known to apply decorations, for example in the form of a company emblem or an advertisement, to various kinds of surfaces. Accordingly, it is also known to apply such decorations to the floor. However, these decorations have hitherto been executed in such a way as to give only a 2-dimensional effect or, at best, to produce a poor 3-dimensional effect.

An example of this is shown in European Patent Application 656.265, which shows a decoration where a printed picture, consisting of transparent colors, is printed on the back side of a transparent sheet of film. Over a large part of this printed picture it is printed a print of non-transparent color, which is placed in a screen consisting of larger or smaller dots. The aim of this is to give an impression to the viewer that different parts of the decoration are in different distances from the viewer. By introducing a screen of larger dots, the part of the decoration being within this screen is said to give the impression of being at a greater distance from the viewer than other parts of the decoration being within a screen of smaller dots of no screen at all.

If at all, this way of building a decoration will give a bad impression of 3-dimensional effect.

The aim of the present invention is to improve the 3-dimensional effect of such a surface decoration. This is achieved by a shaded depiction of the object illustration formed by the printed design, in which the shaded depiction the printed design is transparent, as well as in a method of producing a surface decoration, in that the surface of that part of the printed design forming the object illustration is arranged to coincide with the surface area of the body color print or the non-transparent film, and the surface area of another part of the transparent printed design is arranged to fall outside the surface area of the body color print or the non-transparent film, whereby this part of the design is formed as a shaded depiction of the object illustration.

By utilizing a transparent base sheet—as opposed to the conventional opaque base sheet—as the background supporting the printed design, it is possible by the additional use of transparent decorating colors to achieve the effect that, for example, the floor's surface is shining through the decoration. Over a portion of the decoration there may be applied a non-transparent body color (opaque pigment) and/or an opaque cover sheet of film, rendering the decoration opaque over portions of its decorative surface. On parts of the decorative surface such as, for example, where it is desired to create a shadow effect of the opaque portion of the decoration, no body color is used, and the "shadow" thereby becomes transparent. The result is that it is possible to depict an object that is casting a "shadow" across, for example, a floor.

The invention will now be described in more detail with reference to the accompanying figures, where:

Figure 1:
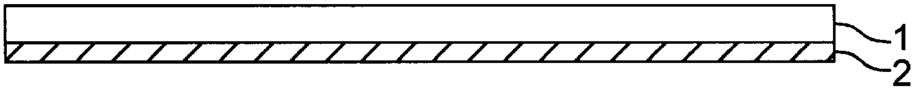
FIGS. 1–5 show the production of the decoration in stages.
Figure 2:
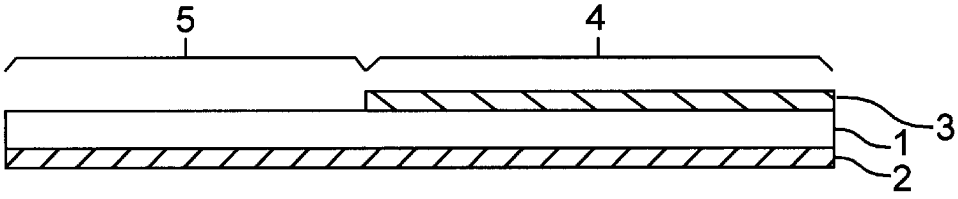

In producing the decoration, one first provides a transparent base sheet of film, which is designated by reference number 1 in FIG. 1. The transparent base sheet 1 may be precoated with a layer of glue 2, or said glue layer may be applied at a later stage. To the top side of the transparent base sheet 1, over at least a portion of the surface thereof, is applied a body color (opaque pigment) 3, or a cover sheet of film. The body color or the cover sheet is non-transparent, and is employed as a base for the decorating colors that will be applied later. The body color 3 should be light, and preferably white. This is to avoid giving an undesirable color cast to the decorating colors. In FIG. 2 the body color 3 is shown applied to a section 4 of base sheet 1, whereupon later a print 6, which is to form an object illustration later is to be applied, while on another section 5 of the base sheet 1, no body color has been applied.

Figure 3:
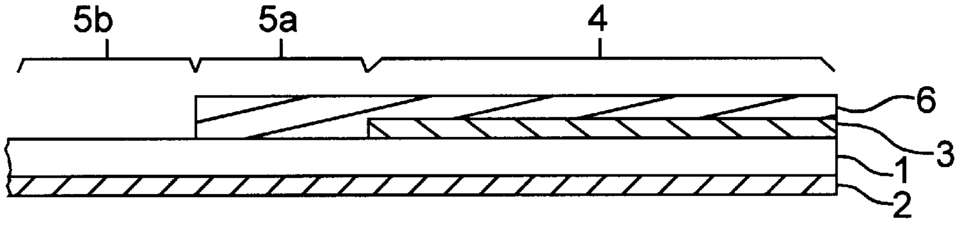

As shown in FIG. 3, one or more transparent decorating colors 6 are then applied. The decorating colors may be placed on both section 4, to which the body color (opaque pigment) 3 has been applied beforehand, and part 5*a,* also denoted the shaded depiction 5*a,* of section 5, to which no body color has been applied. In the part 5*a* the print forms a shaded depiction 5*a,* which is to give the impression of a "shadow" from the object in the object illustration.

Figure 4:
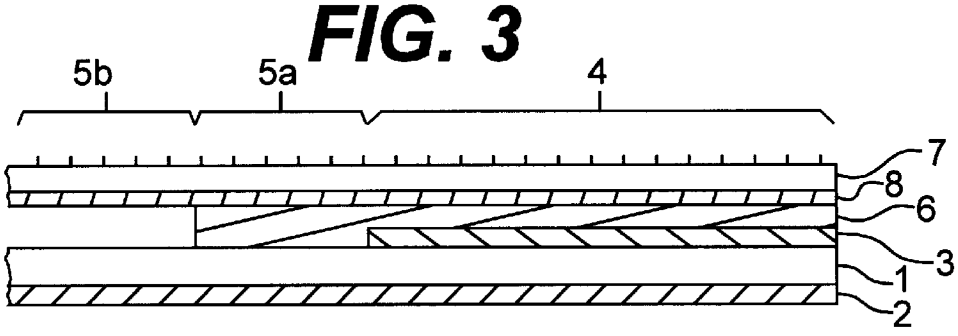

Now the decoration can already be applied to a surface that is to be decorated, such as a wall, for example. However, for use on surfaces exposed to heavy wear, such as a floor, for example, it is practical to lay a protective film sheet 7 over the decoration, as shown in FIG. 4. The protective film sheet is provided with a glue layer 8, which adheres to the decorating colors and/or to the base sheet. Alternatively, the glue layer may be applied to the top surface of the decoration before the protective film sheet is laid on. As can be seen from FIG. 4, a section 5*b* of base sheet 1 has not been coated with either a body color or a decorating color. On this section 5*b* the protective film 7 with its glue layer 8 will lie in direct contact with base sheet 1, although this is not clearly apparent from the schematic illustration in FIGS. 4 and 5. Protective film sheet 7 may be corrugated on the surface thereof opposite the glue layer.

Figure 5:
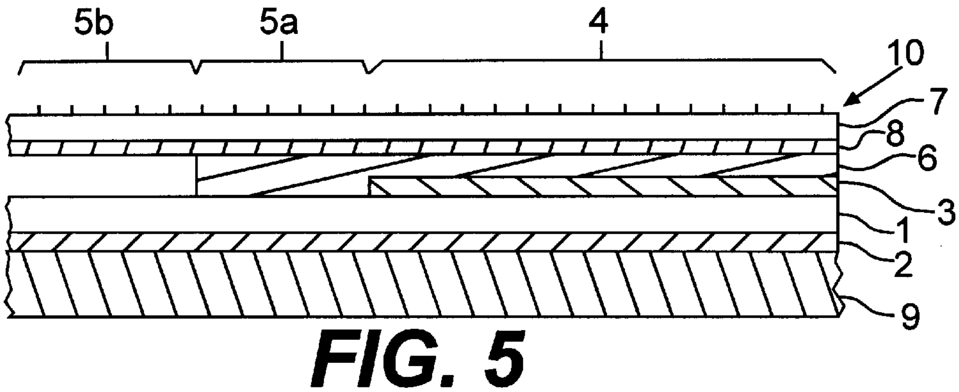

In FIG. 5 the finished surface decoration 10 is shown placed on a floor 9. Here, in section 4, the decorating colors will be able to be seen without floor 9 showing through them, and produce an illustration of an object with a complete coverage of saturated colors. In section 5*a* the decorating colors 6 will again be visible, but in this case the floor 9 will also show through the transparent decorating colors 6, and a dark print in this part will give the impression that the object in the object illustration is casting a shadow on the floor. In section 5*b* only the floor 9 will be visible through the transparent film sheets 1 and 7.

Figure 6:
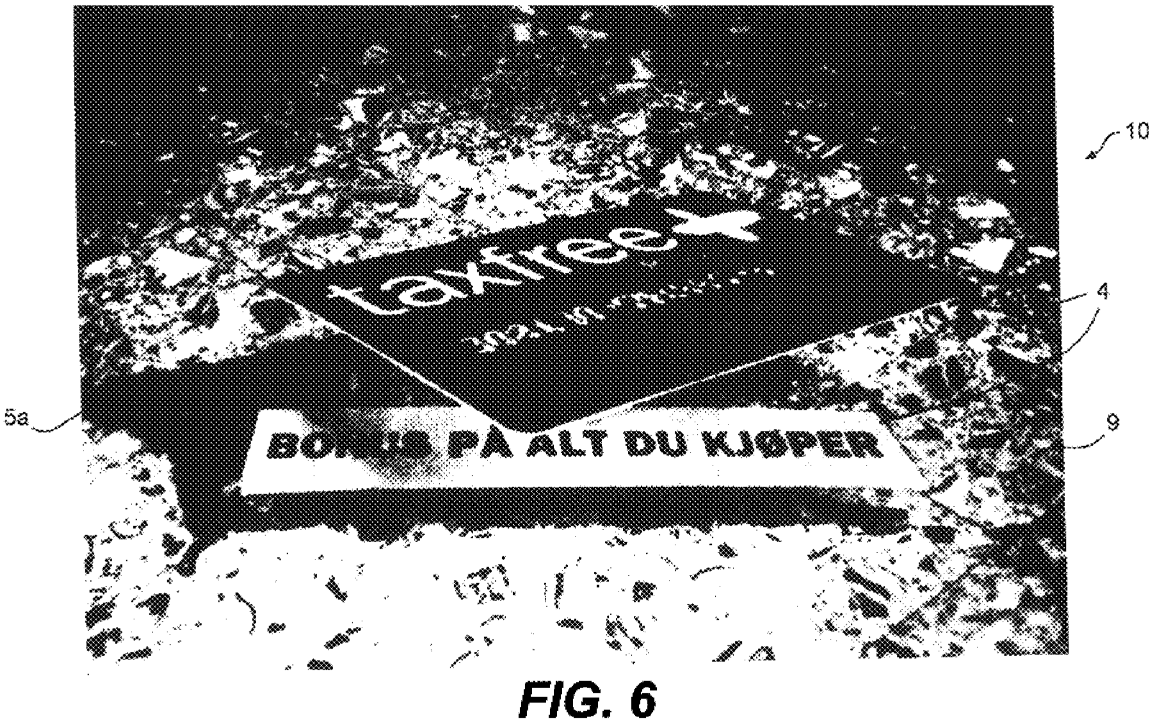
FIG. 6 shows a finished decoration placed on a floor.

In FIG. 6 the finished result is presented. Here, the decoration 10 is laid on a floor 9. As is seen from FIG. 6, sections 4 are completely covered by a color, i.e., a body color (opaque pigment) and a decorating color. Sections 5*a* are provided only with decorating color, and appear here as a "shadow" of the objects depicted in sections 4. The floor 9 is visible through the shadow. Base sheet 1 and/or protective film sheet 10 may extend outside sections 4 and 5*a,* which are coated with a color, but they may also be cut or trimmed so as to cover only the area that is coated with color.

To obtain a partial translucent visibility of the floor, the body color (opaque pigment) over portions of the decoration may be thinned or toned down with a saturation in the range of from 0 to 100%. This can be accomplished by, for example, using a screen in printing the body color. In this manner, by printing the decorating colors in a screen corresponding to the screen used for the body color, it is possible to create an illusion of, for example, sand being strewn over a floor.

The glue in glue layer 2 is preferably of a non-permanent type, permitting removal of the decoration. This is particularly important when the decoration is an advertisement, which is likely to be changed frequently. The glue in glue layer 8 may be permanent or non-permanent.

The protective film should be thick and wear-resistant and is preferably corrugated on the surface in order to improve friction so as to avoid the risk of a slippery surface. The protective film sheet could be omitted in, for example, the decorating of a wall, but it would nevertheless be an advantage here, too. The body color or opaque pigment, and/or the decorating colors, is (are) preferably applied by means of electrostatic printing, but may also be produced by silk screening. The decorating colors preferably comprise 4-color prints, but if desired the decoration may also be printed in fewer colors, or even in shades of gray.

What is claimed is:

1. A surface decoration having a 3-dimensional effect, for placement on a surface, comprising a transparent base sheet of film having a top surface and a bottom surface to face a surface on which the surface decoration is to be placed, a printed design on at least a portion of the top surface of said base sheet, at least one object illustration formed by said printed design and a shaded depiction of said object illustration formed by said printed design, said printed design being transparent in said shaded depiction.

2. A decoration in accordance with claim 1, further comprising a non-transparent body color placed between said base sheet of film and said printed design.

3. A decoration in accordance with claim 2, wherein said body color is light in color.

4. A decoration in accordance with claim 3, wherein said body color is white.

5. A decoration in accordance with claim 1, further comprising an opaque cover sheet of film placed between said base sheet of film and said printed design.

6. A decoration in accordance with claim 5, wherein said opaque cover sheet of film is light in color.

7. A decoration in accordance with claim 6, wherein said cover sheet of film is white.

8. A decoration in accordance with claim 1, wherein a transparent protective film sheet is placed on top of said printed design.

9. A decoration in accordance with claim 8, wherein said protective film sheet is corrugated.

10. A decoration in accordance with claim 2, wherein said body color is thinned or toned down over at least a portion of the decoration so as to render it partially transparent.

11. The utilization of a surface decoration having a 3-dimensional effect, for placement on a floor, comprising a transparent base sheet of film having a top surface and a bottom surface to face the floor, a printed design on at least a portion of said base sheet and at least one object illustration formed by said printed design, as a decoration on a floor and to allow the floor to show through at least portions of the decoration.

* * * * *